(12) United States Patent
Jordan, II et al.

(10) Patent No.: US 10,573,149 B1
(45) Date of Patent: *Feb. 25, 2020

(54) SYSTEMS AND METHODS FOR AUTOMATICALLY GENERATING AN ESCAPE ROUTE

(71) Applicant: State Farm Mutual Automobile Insurance Company, Bloomington, IL (US)

(72) Inventors: Jackie O Jordan, II, Bloomington, IL (US); John Donovan, Bloomington, IL (US); David Turrentine, Bloomington, IL (US); Torri Wollenschlager, Bloomington, IL (US); Bryan R Nussbaum, Bloomington, IL (US); Deanna Stockweather, Normal, IL (US); Jeffrey W Stoiber, Bloomington, IL (US); Kerstin Markwardt, Phoenix, AZ (US); Gail L Carlson, Bloomington, IL (US); Kyle C Schiebel, Bloomington, IL (US); Troy Winslow, Bloomington, IL (US); Joseph P Harr, Bloomington, IL (US); Ellakate Wagner, Bloomington, IL (US); Michael Harris, Jr., Normal, IL (US); Jennylind Sun, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,789

(22) Filed: Feb. 22, 2019

Related U.S. Application Data

(63) Continuation of application No. 15/895,149, filed on Feb. 13, 2018, now Pat. No. 10,282,961, which is a
(Continued)

(51) Int. Cl.
*G08B 1/08* (2006.01)
*G08B 21/02* (2006.01)
(Continued)

(52) U.S. Cl.
CPC ............. *G08B 21/02* (2013.01); *G01C 21/20* (2013.01); *G05B 15/02* (2013.01); *H04L 12/2818* (2013.01); *H04W 4/02* (2013.01)

(58) Field of Classification Search
CPC ........ G08B 21/02; G01C 21/20; G05B 15/02; H04L 12/2818; H04W 4/02
(Continued)

(56) References Cited

U.S. PATENT DOCUMENTS 3,817,161 A * 6/1974 Koplon .................... A62C 3/04
454/342
3,875,612 A   4/1975 Poitras
(Continued)

FOREIGN PATENT DOCUMENTS

| CN | 202865924 U | 4/2013 |
| WO | WO-2013/076721 A1 | 5/2013 |
| WO | WO-2014/207558 A2 | 12/2014 |

OTHER PUBLICATIONS

Knutsen, Confusion about causation in insurance: solutions for catastrophic losses, Ala. L. Rev., 5:957-1023 (2010).
(Continued)

*Primary Examiner* — Zhen Y Wu
(74) *Attorney, Agent, or Firm* — Marshall, Gerstein & Borun LLP

(57) ABSTRACT

Methods and systems for generating escape routes are provided. With a home owner's or insured's permission, a smart home controller or insurance provider remote processor may analyze data received from a plurality of smart devices disposed on, within, or proximate to a home, as well
(Continued)

as data received from an insurance provider. If it is determined that an emergency situation necessitating an evacuation exists, the smart home controller or insurance provider remote processor may automatically generate escape routes to guide occupants to safety. The smart home controller may then transmit the generated escape routes to inform occupants of emergency situation and how to reach safety. The smart home controller and/or insurance provider may also issue commands to smart devices to ensure the safety of the generated escape routes. Insurance policies, premiums, or discounts may be adjusted based upon the escape route determination functionality.

20 Claims, 6 Drawing Sheets

Related U.S. Application Data continuation of application No. 14/873,864, filed on Oct. 2, 2015, now Pat. No. 9,898,912.

(60) Provisional application No. 62/220,383, filed on Sep. 18, 2015, provisional application No. 62/201,671, filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,642, filed on Jul. 1, 2015, provisional application No. 62/187,645, filed on Jul. 1, 2015, provisional application No. 62/187,666, filed on Jul. 1, 2015, provisional application No. 62/187,651, filed on Jul. 1, 2015, provisional application No. 62/187,624, filed on Jul. 1, 2015, provisional application No. 62/105,407, filed on Jan. 20, 2015, provisional application No. 62/060,962, filed on Oct. 7, 2014.

(51) Int. Cl.
*H04W 4/02* (2018.01)
*G05B 15/02* (2006.01)
*H04L 12/28* (2006.01)
*G01C 21/20* (2006.01)

(58) Field of Classification Search
USPC .................................................. 340/539.13
See application file for complete search history.

(56) References Cited

U.S. PATENT DOCUMENTS

| | | | |
|---|---|---|---|
| 5,099,751 A * | 3/1992 | Newman | A62B 3/00 454/187 |
| 5,128,859 A | 7/1992 | Carbone et al. | |
| 5,554,433 A * | 9/1996 | Perrone, Jr. | A62C 2/065 428/192 |
| 5,903,426 A | 5/1999 | Ehling | |
| 6,023,762 A | 2/2000 | Dean et al. | |
| 6,084,367 A * | 7/2000 | Landert | E05F 15/70 318/466 |
| 6,155,324 A * | 12/2000 | Elliott | A62C 2/18 160/1 |
| 6,222,455 B1 | 4/2001 | Kaiser | |
| 6,526,807 B1 | 3/2003 | Doumit et al. | |
| 6,812,848 B2 | 11/2004 | Candela | |
| 6,998,960 B2 * | 2/2006 | Buschmann | G08B 7/062 340/286.05 |
| 7,030,767 B2 | 4/2006 | Candela | |
| 7,194,416 B1 | 3/2007 | Provost et al. | |
| 7,259,656 B1 * | 8/2007 | Wright | G01C 21/20 340/286.14 |
| 7,309,216 B1 | 12/2007 | Spadola, Jr. et al. | |
| 7,348,882 B2 | 3/2008 | Adamczyk et al. | |
| 7,598,856 B1 * | 10/2009 | Nick | G01C 21/206 340/539.13 |
| 7,715,036 B2 | 5/2010 | Silverbrook et al. | |
| 7,809,587 B2 | 10/2010 | Dorai et al. | |
| 7,813,822 B1 | 10/2010 | Hoffberg | |
| 8,031,079 B2 | 10/2011 | Kates | |
| 8,041,636 B1 | 10/2011 | Hunter et al. | |
| 8,106,769 B1 | 1/2012 | Maroney et al. | |
| 8,108,271 B1 | 1/2012 | Duncan et al. | |
| 8,229,861 B1 | 7/2012 | Trandal et al. | |
| 8,280,633 B1 | 10/2012 | Eldering et al. | |
| 8,289,160 B1 | 10/2012 | Billman | |
| 8,316,237 B1 | 11/2012 | Felsher et al. | |
| 8,400,299 B1 | 3/2013 | Maroney et al. | |
| 8,510,196 B1 | 8/2013 | Brandmaier et al. | |
| 8,527,306 B1 | 9/2013 | Reeser et al. | |
| 8,533,144 B1 | 9/2013 | Reeser et al. | |
| 8,595,034 B2 | 11/2013 | Bauer et al. | |
| 8,596,293 B2 | 12/2013 | Mous et al. | |
| 8,605,209 B2 | 12/2013 | Becker | |
| 8,620,841 B1 | 12/2013 | Filson et al. | |
| 8,621,097 B2 | 12/2013 | Venkatakrishnan et al. | |
| 8,650,048 B1 | 2/2014 | Hopkins, III et al. | |
| 8,694,501 B1 | 4/2014 | Trandal et al. | |
| 8,712,893 B1 | 4/2014 | Brandmaier et al. | |
| 8,730,039 B1 | 5/2014 | Billman | |
| 8,731,975 B2 | 5/2014 | English et al. | |
| 8,749,381 B1 | 6/2014 | Maroney et al. | |
| 9,049,168 B2 | 6/2015 | Jacob et al. | |
| 9,280,252 B1 | 3/2016 | Brandmaier et al. | |
| 9,297,150 B2 | 3/2016 | Klicpera | |
| 9,424,606 B2 | 8/2016 | Wilson, II et al. | |
| 9,429,925 B2 | 8/2016 | Wait | |
| 9,652,976 B2 | 5/2017 | Bruck et al. | |
| 9,654,434 B2 | 5/2017 | Sone et al. | |
| 9,824,397 B1 | 11/2017 | Patel et al. | |
| 9,892,463 B1 | 2/2018 | Hakimi-Boushehri et al. | |
| 9,898,912 B1 | 2/2018 | Jordan, II et al. | |
| 2002/0040306 A1 | 4/2002 | Sugiyama et al. | |
| 2004/0054789 A1 | 3/2004 | Breh et al. | |
| 2004/0177032 A1 | 9/2004 | Bradley et al. | |
| 2004/0211228 A1 | 10/2004 | Nishio et al. | |
| 2005/0030175 A1 | 2/2005 | Wolfe | |
| 2005/0080520 A1 | 4/2005 | Kline et al. | |
| 2005/0139420 A1 | 6/2005 | Spoltore et al. | |
| 2005/0251427 A1 | 11/2005 | Dorai et al. | |
| 2005/0275527 A1 | 12/2005 | Kates | |
| 2006/0033625 A1 | 2/2006 | Johnson et al. | |
| 2006/0100912 A1 | 5/2006 | Kumar et al. | |
| 2006/0154642 A1 | 7/2006 | Scannell | |
| 2006/0184379 A1 | 8/2006 | Tan et al. | |
| 2007/0001904 A1 * | 1/2007 | Mendelson | G01C 21/206 342/450 |
| 2008/0018474 A1 | 1/2008 | Bergman et al. | |
| 2008/0019392 A1 | 1/2008 | Lee | |
| 2008/0184272 A1 | 7/2008 | Brownewell | |
| 2008/0285797 A1 * | 11/2008 | Hammadou | G06K 9/00771 382/103 |
| 2009/0001891 A1 * | 1/2009 | Patterson | G08B 7/066 315/129 |
| 2009/0044595 A1 | 2/2009 | Vokey | |
| 2009/0094129 A1 | 4/2009 | Rhodes et al. | |
| 2009/0243852 A1 | 10/2009 | Haupt et al. | |
| 2009/0259581 A1 | 10/2009 | Horowitz et al. | |
| 2009/0265193 A1 | 10/2009 | Collins et al. | |
| 2010/0073840 A1 * | 3/2010 | Hennessey, Jr. | H02H 5/00 361/114 |
| 2010/0235285 A1 | 9/2010 | Hoffberg | |
| 2010/0299217 A1 | 11/2010 | Hui | |
| 2011/0003577 A1 | 1/2011 | Rogalski et al. | |
| 2011/0077875 A1 | 3/2011 | Tran et al. | |

(56) References Cited

U.S. PATENT DOCUMENTS

| | | | |
|---|---|---|---|
| 2011/0112660 A1* | 5/2011 | Bergmann | G08B 7/066 700/29 |
| 2011/0136463 A1* | 6/2011 | Ebdon | G01C 21/20 455/404.1 |
| 2011/0161117 A1 | 6/2011 | Busque et al. | |
| 2011/0195687 A1* | 8/2011 | Das | H04W 4/024 455/404.2 |
| 2012/0016695 A1 | 1/2012 | Bernard et al. | |
| 2012/0101855 A1 | 4/2012 | Collins et al. | |
| 2012/0116820 A1 | 5/2012 | English et al. | |
| 2012/0166115 A1 | 6/2012 | Apostolakis | |
| 2012/0188081 A1 | 7/2012 | Van Katwijk | |
| 2012/0265586 A1 | 10/2012 | Mammone | |
| 2012/0290333 A1 | 11/2012 | Birchall | |
| 2013/0049950 A1 | 2/2013 | Wohlert | |
| 2013/0096960 A1 | 4/2013 | English et al. | |
| 2013/0120137 A1* | 5/2013 | Lehmann | G08B 7/066 340/524 |
| 2013/0144486 A1 | 6/2013 | Ricci | |
| 2013/0145693 A1* | 6/2013 | Li | G09F 13/20 49/70 |
| 2013/0159021 A1 | 6/2013 | Felsher | |
| 2013/0169817 A1* | 7/2013 | Jones | G08B 25/14 348/159 |
| 2013/0226624 A1 | 8/2013 | Blessman et al. | |
| 2013/0234840 A1 | 9/2013 | Trundle et al. | |
| 2013/0257626 A1 | 10/2013 | Masli et al. | |
| 2013/0290033 A1 | 10/2013 | Reeser et al. | |
| 2014/0122133 A1 | 5/2014 | Weisberg et al. | |
| 2014/0136242 A1 | 5/2014 | Weekes et al. | |
| 2014/0180723 A1 | 6/2014 | Cote et al. | |
| 2014/0201315 A1 | 7/2014 | Jacob et al. | |
| 2014/0201844 A1 | 7/2014 | Buck | |
| 2014/0222329 A1* | 8/2014 | Frey | G08B 7/066 701/423 |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0266717 A1 | 9/2014 | Warren et al. | |
| 2014/0278571 A1 | 9/2014 | Mullen et al. | |
| 2014/0303801 A1 | 10/2014 | Ahn et al. | |
| 2014/0313044 A1* | 10/2014 | Thompson | G08B 21/10 340/686.6 |
| 2014/0340216 A1 | 11/2014 | Puskarich | |
| 2014/0358592 A1 | 12/2014 | Wedig et al. | |
| 2014/0379156 A1 | 12/2014 | Kamel et al. | |
| 2015/0124087 A1* | 5/2015 | Jones, Jr. | G08B 13/19695 348/143 |
| 2015/0135596 A1* | 5/2015 | Cooper | A62C 2/10 49/420 |
| 2015/0154712 A1 | 6/2015 | Cook | |
| 2015/0160623 A1 | 6/2015 | Holley | |
| 2015/0160636 A1* | 6/2015 | McCarthy | G05B 15/02 348/552 |
| 2015/0163412 A1* | 6/2015 | Holley | G05B 15/02 348/143 |
| 2015/0170288 A1 | 6/2015 | Harton et al. | |
| 2015/0206249 A1 | 7/2015 | Fini | |
| 2015/0287310 A1 | 10/2015 | DeIuliis et al. | |
| 2015/0332407 A1 | 11/2015 | Wilson, II et al. | |
| 2015/0364028 A1 | 12/2015 | Child et al. | |
| 2016/0018226 A1* | 1/2016 | Plocher | A62B 3/00 701/428 |
| 2016/0042463 A1 | 2/2016 | Gillespie | |
| 2016/0078744 A1 | 3/2016 | Gieck | |
| 2016/0104250 A1 | 4/2016 | Allen et al. | |
| 2016/0269882 A1* | 9/2016 | Balthasar | H04W 4/90 |
| 2017/0147722 A1 | 5/2017 | Greenwood | |
| 2017/0304659 A1* | 10/2017 | Chen | G01C 21/206 |

OTHER PUBLICATIONS

U.S. Appl. No. 14/692,864, Final Office Action, dated Nov. 8, 2017.
U.S. Appl. No. 14/692,864, Nonfinal Office Action, dated May 16, 2017.
U.S. Appl. No. 14/692,943, Nonfinal Office Action, dated Sep. 12, 2017.
U.S. Appl. No. 14/692,946, Final Office Action, dated Oct. 30, 2017.
U.S. Appl. No. 14/692,946, Nonfinal Office Action, dated Apr. 4, 2017.
U.S. Appl. No. 14/692,953, Nonfinal Office Action, dated Sep. 19, 2017.
U.S. Appl. No. 14/692,961, Final Office Action, dated Sep. 1, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,032, Nonfinal Office Action, dated Sep. 7, 2017.
U.S. Appl. No. 14/693,034, Nonfinal Office Action, dated May 17, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Mar. 15, 2017.
U.S. Appl. No. 14/873,823, Final Office Action, dated Nov. 3, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
U.S. Appl. No. 14/873,864, Notice of Allowance, dated Aug. 28, 2017.
U.S. Appl. No. 14/873,942, Nonfinal Office Action, dated Nov. 22, 2017.
U.S. Appl. No. 14/873,864, Notice of Allowance, dated Dec. 21, 2017.
U.S. Appl. No. 14/873,914, Nonfinal Office Action, dated Dec. 26, 2017.
U.S. Appl. No. 14/692,961, Nonfinal Office Action, dated Dec. 28, 2017.
U.S. Appl. No. 14/693,021, Final Office Action, dated Jan. 25, 2018.
U.S. Appl. No. 14/873,864, Corrected Notice of Allowance, dated Jan. 18, 2018.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,032, Final Office Action, dated Mar. 22, 2018.
U.S. Appl. No. 14/693,032, Notice of Alowance, dated Jun. 22, 2018.
U.S. Appl. No. 14/693,039, Nonfinal Office Action, dated May 3, 2018.
U.S. Appl. No. 14/693,057, Final Office Action, dated Feb. 7, 2018.
U.S. Appl. No. 14/873,722, Final Office Action, dated Jun. 15, 2018.

(56) References Cited

OTHER PUBLICATIONS

U.S. Appl. No. 14/873,783, Final Office Action, dated May 23, 2018.
U.S. Appl. No. 14/873,823, Final Office Action, dated Jun. 29, 2018.
U.S. Appl. No. 14/873,823, Nonfinal Office Action, dated Feb. 23, 2018.
U.S. Appl. No. 14/873,864, Corrected Notice of Allowability, dated Jan. 18, 2018.
U.S. Appl. No. 14/873,942, Nonfinal Office Action, dated Mar. 16, 2018.
U.S. Appl. No. 15/409,248, flied Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, filed Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,271, filed Jan. 18, 2017, 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".

\* cited by examiner

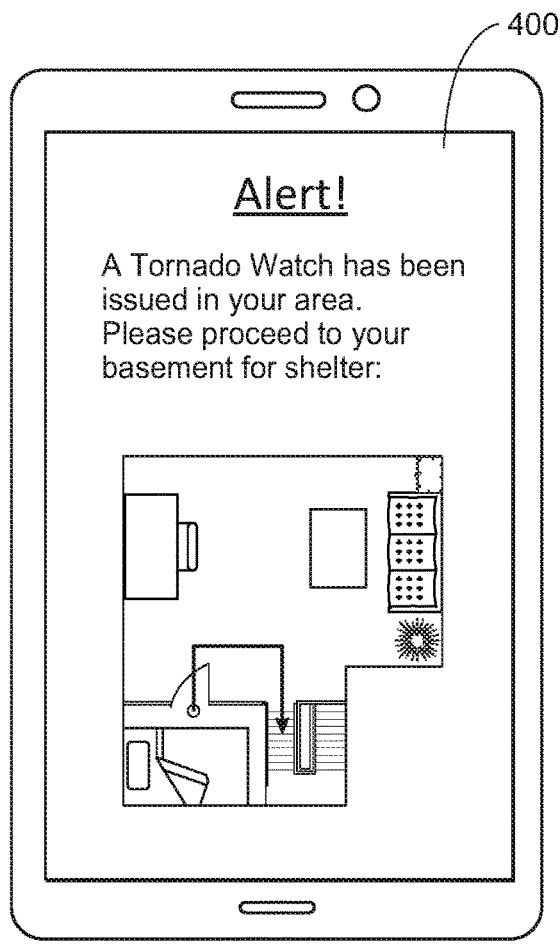
FIG. 4A                    FIG. 4B

SYSTEMS AND METHODS FOR AUTOMATICALLY GENERATING AN ESCAPE ROUTE

CROSS-REFERENCE TO RELATED APPLICATIONS

This application is a continuation of, and claims the benefit of, U.S. patent application Ser. No. 15/895,149 (filed Feb. 13, 2018 and entitled "SYSTEMS AND METHODS FOR AUTOMATICALLY GENERATING AN ESCAPE ROUTE"), which is a continuation of, and claims the benefit of, U.S. patent application Ser. No. 14/873,864 (filed Oct. 2, 2015, and entitled "SYSTEMS AND METHODS FOR AUTOMATICALLY GENERATING AN ESCAPE ROUTE"), which claims benefit of the filing date of U.S. Provisional Patent Application No. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"), 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to generating an escape route, more particularly, to systems and methods that leverage a plurality of smart appliances or devices to ensure the safety of the escape route.

BACKGROUND

There are many emergency situations that may impact buildings and the people located within the buildings. In some scenarios, a person located within a building may be unaware of the emergency situation. Currently, many appliances and other goods are capable of communicating information about their operation via mesh networks as part of the "internet of things." However, there is no way to aggregate and analyze all of this communicated data to detect the presence of an emergency situation. Further, there is no way to analyze the data to determine the best route for the people located within the building to evacuate.

SUMMARY

The present embodiments may, inter alia, detect emergency situations and determine a best escape route for individuals located on the property to increase the likelihood of a safe evacuation for the individuals at risk of harm. For instance, a system and method may facilitate communications with connected devices and items, and/or facilitate the evacuation of individuals located on a property (e.g., smart home). The present embodiments may monitor sensor data received from a plurality of devices populated on the premises of the property. Each of the plurality of devices may be configured to monitor various conditions of the property to determine the presence of an emergency situation that necessitates an evacuation and/or taking shelter. A controller may determine the location of an individual located on the property to generate an escape route that safely guides the individual to a safe zone. The controller may also determine a set of actions that may be performed by the plurality of devices that assists in keeping the escape route safe. The controller may also ensure that the plurality of devices execute and/or carry out the instructions to keep the escape route safe. Additionally, the controller may transmit the escape route to the individual to ensure effective and efficient evacuation procedures while minimizing the risk of harm to the individual.

In one aspect, a computer-implemented method of escape route management for a property may be provided. The property may be populated with a hardware controller in communication with a plurality of devices and each of the plurality of devices may be configured to monitor various conditions associated with the property. The method may include (1) receiving, by the hardware controller via a first communication network, a first set of sensor data from at least one of the plurality of devices, the first set sensor data indicative of an emergency situation necessitating evacuation; (2) analyzing, by one or more processors, the first set of sensor data to determine that an individual is located on the property, the first set of sensor data indicating a location of the individual; (3) based upon the first set of sensor data and the location of the individual, determining, by the one or more processors, an escape route for the individual to evacuate an area made unsafe by the emergency situation; (4) determining, by the one or more processors, a first set of actions to be performed by a first portion of the plurality of devices to ensure safety of the escape route; and/or (5) directing and/or controlling, by the one or more processors, the first portion of the plurality of devices to perform the first set of actions to facilitate escape from the emergency or dangerous situation using the escape route. The method may include additional, less, or alternate actions, including those discussed elsewhere herein.

In one aspect, a system for escape route management for a property may be provided. The property populated with a hardware controller in communication with a plurality of devices and each of the plurality of devices may be configured to monitor various conditions associated with the property. The system may include (i) a communication module adapted to communicate data; (ii) a memory adapted to store non-transitory computer executable instructions; and/or (iii) one or more processors adapted to interface with the communication module. The one or more processors may be configured to execute the non-transitory computer executable instructions to cause the system to (1) receive, via the communication module, a first set of sensor data from at least one of the plurality of devices, the first set sensor data indicative of an emergency situation necessitating evacuation; (2) analyze, by the one or more processors, the first set of sensor data to determine that an individual is located on the property, the first set of sensor data indicating a location of the individual; (3) based upon the first set of sensor data and the location of the individual, determine, by the one or more processors, an escape route for the individual to evacuate an area made unsafe by the emergency situation; (4) determine, by the one or more processors, a first set of actions to be performed by a first portion of the plurality of devices to ensure safety of the escape route; and/or (5) direct and/or control, by the one or more processors, the first portion of the plurality of devices to perform the first set of actions to facilitate escape from an emergency or dangerous situation. The system may include additional, less, or alternate actions, including those discussed elsewhere herein.

In one aspect, a non-transitory computer-readable storage medium storing processor-executable instructions may be provided. When executed, the instructions may cause one or more processors to (1) receive by the one or more processors via a local communication network, a first set of sensor data from at least one of the plurality of devices, the first set sensor data indicative of an emergency situation necessitating evacuation; (2) analyze, by the one or more processors, the first set of sensor data to determine that an individual is located on the property, the first set of sensor data indicating a location of the individual; (3) based upon the first set of sensor data and the location of the individual, determine, by the one or more processors, an escape route for the individual to evacuate an area made unsafe by the emergency situation; (4) determine, by the one or more processors, a first set of actions to be performed by a first portion of the plurality of devices to ensure safety of the escape route; and/or (5) direct and/or control, by the one or more processors, the first portion of the plurality of devices to perform the first set of actions to facilitate escape from the emergency or dangerous situation using the escape route. The instructions may cause additional, less, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4A depicts an exemplary interface, displayable by an electronic device, for alerting an individual about an emergency situation, in accordance with some embodiments;

FIG. 4B depicts an exemplary interface, displayable by an electronic device, for alerting an individual that the escape route has been changed, in accordance with some embodiments;

DETAILED DESCRIPTION

Figure 1:
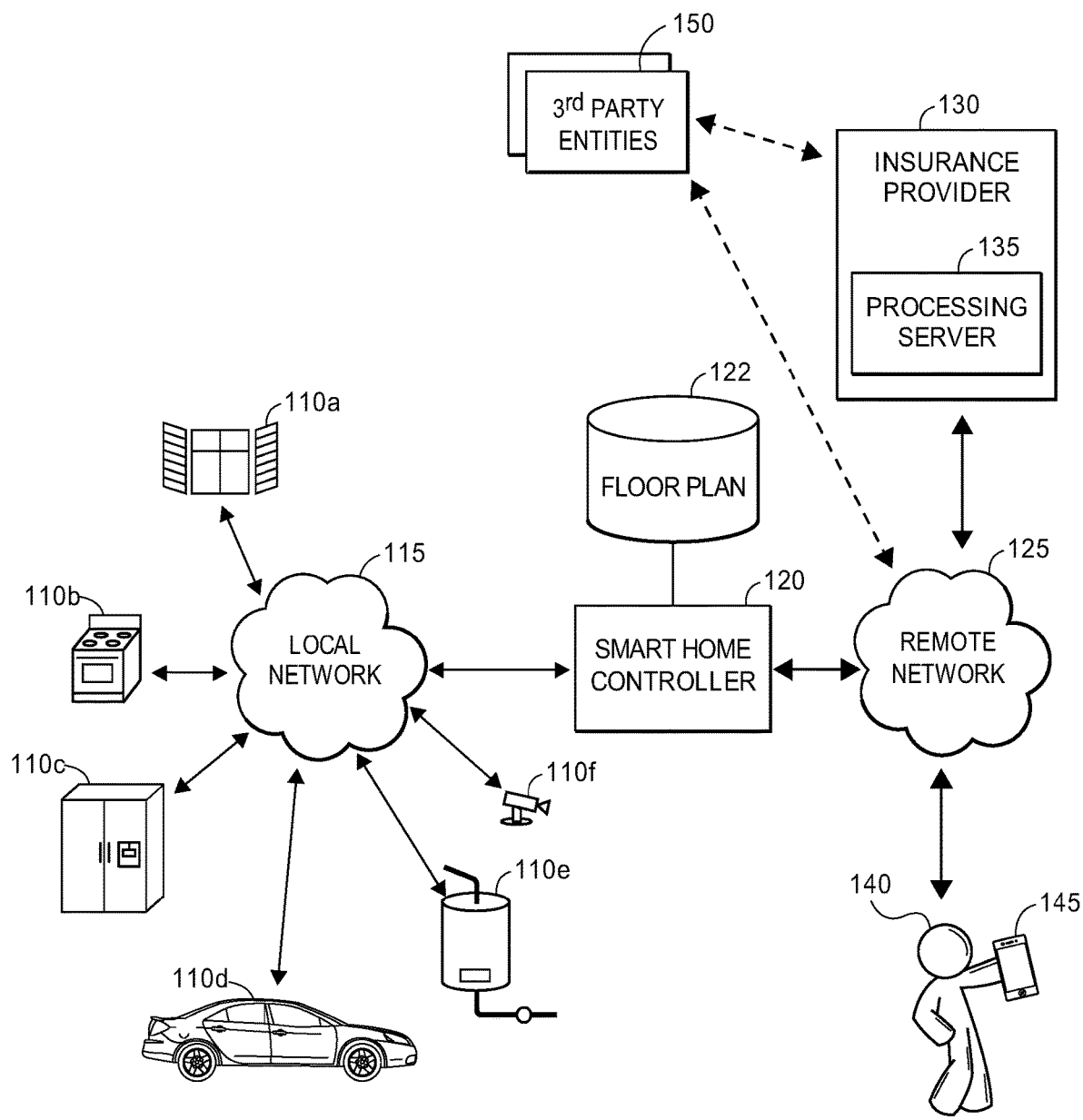
FIG. 1 depicts an exemplary environment including components and entities associated with generating an escape route in response to detecting an emergency situation, in accordance with some embodiments.

The present embodiments may relate to, inter alia, the evacuation, taking of shelter, escaping, or other action to avoid harm caused by an emergency situation. The emergency situation may be caused by water, fire, hail, wind, tornados, hurricanes, volcanos, gunmen, and/or other sources. The present embodiments may also relate to (a) detecting the emergency situation; (b) determining an escape route; (c) monitoring the safety of the escape route; (d) guiding the individual along the escape route; (e) providing safety tips; (f) communicating with emergency services; and/or (g) other evacuation-related activities.

A home may have a "smart" central controller (referred to as a "smart home controller" herein) and be wirelessly interconnected, or even hard-wired, with various household related items and/or sensors. Despite being referred to as the "smart home controller," the central controller may be associated with any type of property, such as offices, restaurants, farms, and/or other types of properties. The smart home controller may be in wireless or wired communication with various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart personal vehicles, smart thermostats, smart windows, doors, or garage doors, smart window blinds or shutters, and/or other smart devices and/or sensors capable of wireless or wired communication. Each smart device (or smart sensor), as well as the smart home controller, may be equipped with a processor, memory unit, software applications, wireless transceivers, local power supply, various types of sensors, and/or other components.

Each of the smart devices may be included on an inventory list associated with the property. The inventory list may detail a location (e.g., GPS coordinates, a room of the property, an area or section of the property, or other location indication) of each of the smart devices. In this regard, multiple smart devices may be associated with a single area or location of the property (e.g., a basement, a bathroom, a kitchen, a first floor, etc.). Similarly, the inventory list may track the capabilities of each of the smart devices. For example, a smart fire ladder may be able to remotely receive instruction to deploy a ladder and/or roll the ladder back up. Of course, the capabilities of each smart device may vary between smart devices.

The smart home controller may remotely gather data from the smart devices (or smart sensors) dispersed around or otherwise interconnected within the property. The smart home controller may also receive data from an insurance provider (or other third party sources) that monitors potential risks to the property, such as inclement weather, crime patterns, recall data pertaining to goods disposed on or proximate to the property and/or other risks. The smart home controller may analyze the data and automatically detect emergency situations that threaten the well-being of individuals located on the property. Upon detection of an emergency situation, the smart home controller may issue commands or messages via wireless or wired communication networks and/or data transmission that may serve to lead to a safe evacuation.

The smart home controller may also remotely gather data from the smart devices (or sensors associated therewith) dispersed around or otherwise interconnected within the property to determine an occupancy state of the property. The occupancy state may indicate whether any individuals are currently located on the premises of the property, whereby the property may be deemed unoccupied if no individuals are currently located within, or in proximity to, the property or may be deemed occupied if at least one individual is located within, or in proximity to, the property. The occupancy state may also include an identity of which room the individuals located on the premises of the property are currently located.

As an example, the smart home controller may detect, via a heat sensor, visual sensor, and/or a smoke detector, that a fire is present on the property. The smart home controller may check the occupancy state of the property to determine whether any individuals need to evacuate the property. If there are any individuals on the property, the smart home controller may generate an escape route for each individual to safely evacuate the property. The smart home controller may communicate the escape routes to a mobile device associated with each individual. As a result, the mobile devices may display an interface that notifies the individual about the fire (or other emergency situation) and guides the individual along their respective escape route.

To ensure the safety of the escape routes, the smart home controller may analyze the location of the smart devices compared to locations of the individual, emergency situation, and/or escape routes. The controller may then determine if the capabilities of the smart devices may assist the individuals in safely evacuating the property. For example, a steel shutter may be deployed to help contain a fire in one room, thus ensuring that individuals can more safely traverse the remainder of the property. It should be appreciated that when there are multiple individuals evacuating the property, the smart home controller may ensure that performing the action to ensure the safety of a first individual's escape route does not impede the ability of a second individual to follow their respective escape route.

The systems and methods discussed herein address a challenge that is particular to home automation. In particular, the challenge relates to a lack of user ability to effectively control certain components within a property during an emergency situation. This is particularly apparent when the user is not aware of an emergency situation and may not have time to manually perform actions to ensure their own safety. For example, the user may be unaware of unseen electrocution risks caused by flooding. Moreover, in an emergency situation, users may panic and be unable to decide on a proper course of action. Instead of requiring users to manually figure out the best way to evacuate the property and/or deploy safety equipment, as required on conventional properties, the systems and methods dynamically determine the best escape route to safely evacuate the property and automatically adjust the operation of the smart devices to ensure escape route safety. Therefore, because the systems and methods employ dynamic operation of connected devices within a property, the systems and methods are necessarily rooted in computer technology in order to overcome the noted shortcomings that specifically arise in the realm of home automation.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components may compile operation data of connected devices, analyze the operation data, determine the presence of an emergency situation, generate escape routes, communicate relevant data between or among a set of devices, and/or dynamically adjust device operation, among other functionalities. This combination of elements impose meaningful limits in that the operations are applied to improve home automation by improving the consolidation and analysis of operation data, and by facilitating and/or enabling the efficient adjustment of connected device operation in a meaningful and effective way to ensure safe evacuation.

The systems and methods therefore may offer a benefit to customers by enabling homeowners to receive sufficient warning about emergency situations in the homes and to provide instructions on how to safely evacuate the home. By communicating these instructions to homeowners, the smart home controller may minimize the risk of harm to homeowners. Further, insurance providers may experience a reduction in the number of claims and/or a reduction in the amount claimed as a result of the homeowners evacuating properties in a safer and/or organized manner, thus reducing their overall liabilities. The present systems and methods may also provide improvements, in certain aspects, to the technological fields of insurance, emergency response, appliance manufacturing, and/or urban planning.

1. EXEMPLARY ENVIRONMENT FOR ESCAPE ROUTE DETERMINATION

FIG. 1 depicts an exemplary environment 100 associated generating an escape route in response to detecting an emergency situation. Although FIG. 1 depicts certain entities, components, and devices, it should be appreciated that additional or alternate entities and components are envisioned.

As illustrated in FIG. 1, the environment 100 may include a plurality of smart devices 110 that may be connected to a local communication network 115. As shown in FIG. 1, the plurality of smart devices 110 may include smart window shutters 110a, a smart oven 110b, a smart refrigerator 110c, a smart vehicle 110*d*, a smart water supply 110*e*, and/or a smart surveillance camera 110*f*. Although FIG. 1 depicts six smart devices in the environment 100, it should be appreciated that additional or fewer smart devices may be present in other embodiments. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters, and/or remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of smart devices 110 may be configured to communicate with a smart home controller 120 via the local communication network 115. The local network 115 may facilitate any type of data communication between devices and controllers located on or proximate to the property via any standard or technology (e.g., Bluetooth®, RFID, X10, UPnP®, IEEE 802 including Ethernet, GSM, CDMA, LTE, and/or others). According to present embodiments, the plurality of smart devices 110 may transmit, to the smart home controller 120 via the local network 115, sensor data gathered from sensors associated with the plurality of smart devices 110. The sensor data may be audio data, image or video data, or status data. For example, the sensor data may indicate the flow rate of water through a pipe, thermal imaging data, the status of an alarm, sound detected by a smart device, and/or other information pertinent to determining the presence of an emergency situation.

The smart home controller 120 may analyze the received sensor data and transmit, via the local network 115, instructions or commands to the plurality of smart devices 110. As an example, the smart home controller 120 may determine, via a water level sensor, that a basement has flooded. As a result, the smart home controller 120 may transmit an instruction to activate de-watering equipment and/or other actions to ensure safe evacuation during a flood event. In some embodiments, the smart de-watering equipment may respond by transmitting, to the smart home controller 120 via the local network 115, a confirmation that the action has been successfully performed.

According to present embodiments, the smart home controller 120 may be coupled to a database 122 that stores floor plan data associated with the property and/or plurality of smart devices 110. In some embodiments, the database 122 may contain a layout or virtual map of the property, including points of entry/exit, the location of the plurality of smart devices 110, and/or the location of any individuals located on the property. The smart home controller 120 may access the floor plan and/or any other location data to generate a plurality of escape routes to the individuals. Although FIG. 1 depicts the database 122 as coupled to the smart home controller 120, it is envisioned that the database 122 may be maintained in the "cloud" such that any element of the environment 100 capable of communicating over either the local network 115 or a remote network 125 may directly interact with database 122.

The smart home controller 120 may also be in communication, via the remote network 125, with an electronic device 145 associated with the homeowner 140. The electronic device 145 associated with the homeowner 140 may be a smartphone, a desktop computer, a laptop, a tablet, a smart watch, smart glasses, phablet, smart contact lenses, wearable electronics, pager, personal digital assistant, computing device configured for wireless communication, or any other electronic device. The remote network 125 may facilitate any data communication between the smart home controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology. Although FIG. 1 depicts the smart home controller 120 and the homeowner 140 in communication via the remote network 125, there are embodiments in which the homeowner 140 is on the property and in communication with the smart home controller 120 via the local network 115.

In some embodiments, when the smart home controller 120 determines that an emergency situation exists, the smart home controller 120 may generate and transmit a notification to the electronic device 145 via the local network 115 and/or the remote network 125. The notification may include, inter alia, a description of the emergency situation, a location of the emergency situation, an escape route (including instructions) to evacuate the property safely, visual location data depicting the escape route on a floor plan and/or map, safety tips to remember while evacuating, and/or any other information relevant to safely evacuating a property. In some embodiments, the electronic device 145 may provide an interface such that the homeowner 140 may view any of the transmitted information. The interface may also enable the homeowner 145 to monitor, in substantially real time, their current location, a current status of the areas of the property made unsafe by the emergency situation, progress along the escape route, and/or the like.

The smart home controller 120 may also be in communication with an insurance provider 130 via the remote network 125. According to present embodiments, the insurance provider 130 may include one or more processing servers 135 configured to facilitate the functionalities described herein. Although FIG. 1 depicts the insurance provider 130, it should be appreciated that other entities that are capable of monitoring emergency situations are envisioned. For example, a fire department or other entity tasked with responding to emergency situations may utilize the systems and methods to receive accurate information about the location of a fire and/or any individuals trapped by the fire to develop optimal fire rescue strategies. Thus, it may not be necessary for the property to have an associated insurance policy for the property owners to enjoy the benefits of the systems and methods. Further, although FIG. 1 depicts the processing server 135 as part of the insurance provider 130, it should be appreciated that the processing server 135 may be separate from (and connected to and/or accessible by) the insurance provider 130 or other entity interested in monitoring the data described herein.

According to present embodiments, the insurance provider 130 may also receive data from third party entities 150 pertaining to the detection of an emergency situation. For example, the insurance provider 130 may receive information from a weather service about a tornado detected within the vicinity of the property. As another example, the insurance provider may receive information about active gunmen or other similar security threat proximate to the property. Based upon an analysis of the data received from the third party entities 150, the insurance provider 130 may transmit an indication to the smart home controller 120, via the local network 115 and/or the remote network 125, to notify the homeowner 140 about emergency situation and/or direct the homeowner 140 to proceed along an escape route. It should be appreciated that in some embodiments, the third party entities 150 may be able to communicate directly with the smart home controller 120. The exemplary environment 100 may include additional, fewer, or alternate equipment or components, including those discussed elsewhere herein.

II. EXEMPLARY ESCAPE ROUTE COMMUNICATION

Figure 2:
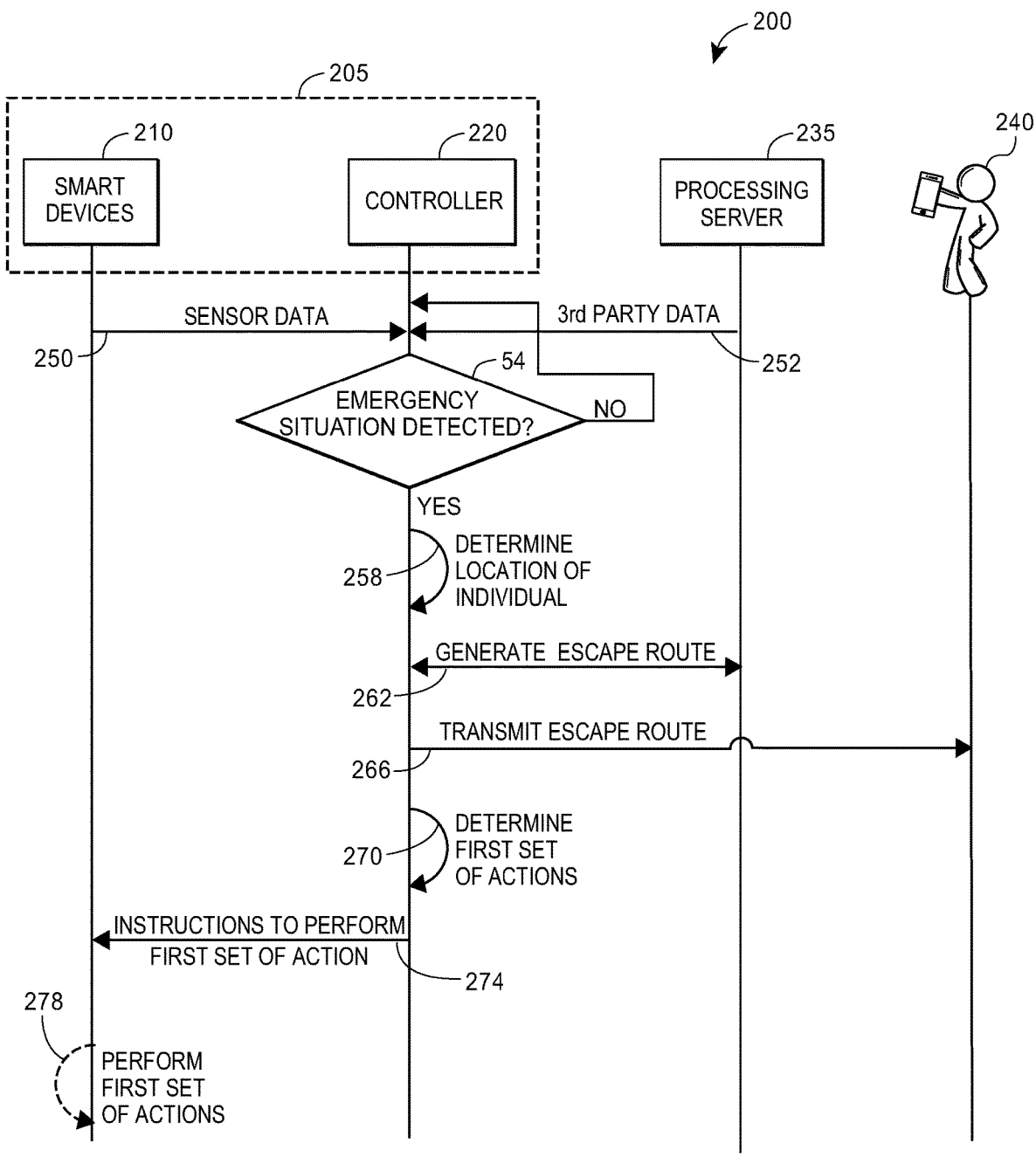
FIG. 2 depicts an exemplary signal diagram associated with generating an escape route in response to detecting an emergency situation, in accordance with some embodiments.

Referring to FIG. 2, illustrated is a signal diagram 200 associated with generating an escape route in response to detecting an emergency situation. In particular, FIG. 2 may include a plurality of smart devices 210 (such as the plurality of smart devices 110 as described with respect to FIG. 1) disposed on a property 205, a smart home controller 220 (such as the smart home controller 120 as described with respect to FIG. 1), processing server 235 (such as the processing server 135 as described with respect to FIG. 1), and/or an individual 240 (such as the homeowner 140 as described with respect to FIG. 1) associated with an electronic device. In some embodiments, the smart home controller 220 may be coupled to a database that stores floor plan data (such as the floor plan database 122 as described with respect to FIG. 1). It should be appreciated the electronic device may be any electronic device (e.g., a smartphone, a desktop computer, a laptop, a tablet, phablet, netbook, notebook, a smart watch, smart glasses, smart contact lenses, wearable electronics device, other mobile device, etc.).

The signal diagram 200 may begin when the plurality of smart devices 210 transmit (250) sensor data to the smart home controller 220 and/or when the processing server 235 transmits (252) data gathered by third parties to the smart home controller 220. The sensor data may include data, such as audio data, visual data, and status data, relevant to determining the presence of an emergency situation. The smart devices 210 may be configured to transmit the sensor data at a regular interval (e.g., every ten seconds) and/or in response to a trigger event (e.g., detecting the presence of smoke). It should be appreciated the length of the regular interval may vary based upon the type of each smart device 210 and the operational state of each smart device 210.

According to some embodiments, the processing server 235 may transmit, to the smart home controller 220, data received from one or more various third party reporting agencies or entities. The data provided by the third party reporting agencies may include information that describes inclement weather patterns and/or other situations that may necessitate an evacuation. The insurance provider 230 may transmit the data to the smart home controller 220 in a periodical report (e.g., daily or bi-daily) or in response to a trigger event (e.g., the National Weather Service® issuing a tornado warning). It should be appreciated that in some embodiments, the smart home controller 220 may receive the data directly from the third party reporting agencies instead of via the processing server 235.

After receiving the sensor data from the smart devices 210 and/or after receiving the third party data from the processing server 235, the smart home controller 220 may analyze (254) the received data to detect the presence of an emergency situation. For example, the smart home controller 220 may analyze the received thermal imaging data to detect the presence of a fire on the premises of the property 205 (and/or determine the extent of the fire). As another example, the smart home controller 220 may analyze received water level data to detect that there is a flooding event on the premises of the property 205 (and/or determine the extent of the flooding). In yet another example, the smart home controller 220 may analyze received audio data to detect that a gunshot was fired on the premises of the property 205. Of course, the smart home controller 220 may analyze any received data to determine the presence of any emergency situation that may necessitate evacuation.

If the smart home controller 220 analyzes the received data and determines that an emergency situation necessitating an evacuation does not currently exist ("NO"), processing may return to the beginning of the signal diagram 200 where the smart home controller 220 may await new data from the smart devices 210 and/or processing server 235. In contrast, if the smart home controller 220 determines that there is an emergency situation necessitating an evacuation ("YES"), the smart home controller 220 may determine whether there are any occupants on the premises of the property 205 that require evacuation. In some embodiments, occupancy is determined by querying an occupancy state and/or by analyzing one or more of motion sensor data, infrared data, alarm system data, electronic device communications, and or other information indicating the presence of an individual on the premises of the property 205. In scenarios in which there are no individuals on the premises of the property 205, the signal diagram 200 may terminate since there are no individuals that need an escape route. In these scenarios, the smart home controller 220 may still generate and transmit commands to the plurality of smart devices 210 in order to mitigate damage to the property 205.

Conversely, if the smart home controller 220 detects the presence of the individual 240 on the premises of the property 205, the smart home controller 220 may determine a location of the individual 240. In some embodiments, the smart home controller 220 may track individuals as they traverse the property 205, regardless of the presence of the emergency situation. In these embodiments, the smart home controller 220 may query the tracking routine to determine the location of the individual 240. In some further embodiments, the smart home controller 220 may detect identifying information transmitted from the electronic device associated with the individual 240. In these embodiments, the smart home controller 220 may be able to determine a location in which a signal containing an identity of the electronic device originated. It should be appreciated that any means to detect the location of the individual 240 on the premises of the property 205 is envisioned.

As part of determining the location of the individual 240, the smart home controller 220 may determine a room and/or other location on the premises of the property 205. According to some embodiments, the smart home controller 220 may access a floor plan stored in the floor plan database. The smart home controller 220 may then compare the determined location of the individual 240 to the floor plan to determine the location of the individual 240 on the premises of the property 205. For example, the smart home controller 220 may detect that the electronic device associated with the individual 240 is transmitting identifying information from a particular location within the property 205. The smart home controller 220 may then compare this particular location to the floor plan to determine, for example, that the electronic device is located in the ground floor kitchen. Accordingly, the smart home controller 220 may determine that the individual 240 is located within the ground floor kitchen as well. It should be appreciated the collection of any data used to determine presence of the emergency, the occupancy of the property and/or the location of individuals on the property may comprise the "first set of sensor data."

Once the location of the individual 240 is known, the smart home controller 220 may generate an escape route to guide the individual 240 from their current location to an area associated with a lower risk of harm due to the emergency situation (as used generally herein, a "safe zone"). For ease of description, the generation of the escape route is described as being performed by the smart home controller 220; however, it is envisioned that the processing server 235 may independently or in coordination with the smart home controller 220 generate the escape route. According to embodiments, the smart home controller 220 may maintain a list of safe zones wherein the list associates each safe zone with a list of emergency situations in which evacuation to the safe zone is appropriate. For example, a safe zone that is a "safe room" may be appropriate for a gunman and/or home invader situation, yet inappropriate for a hurricane situation. Additionally, the safe zones may be located either on the premises of the property 205 (e.g., a basement during a tornado scenario) or off the premises of the property 205 (e.g., a neighboring property during a fire scenario). Based upon the present type of emergency situation, the smart home controller 220 may compile a list of all appropriate safe zones to which the individual 240 may evacuate the property 205.

According to embodiments, the smart home controller 220 may then generate a plurality of escape routes guiding the individual 240 from their current location to one of the appropriate safe zones. In generating the escape routes, the smart home controller 220 may only generate escape routes that avoid areas made unsafe by the emergency situation. For example, during a fire scenario, the smart home controller 220 may determine that a hallway situated between the current location of the individual 240 and a safe zone is currently ablaze. In this example, the smart home controller 220 may avoid generating escape routes that guide the individual 240 through that hallway. In some embodiments, an escape route may require the deployment of emergency equipment (i.e., fire ladders, flotation devices, emergency lighting, and/or the like) for the individual 240 to evacuate the property 205.

Once the smart home controller 220 has generated a plurality of potential escape routes, the smart home controller 220 may select a best escape route for the individual 240 to evacuate the property 205. To select the best escape route, the smart home controller 220 may analyze a plurality of factors associated with each potential escape route. For example, the smart home controller may compare an estimated time to reach a safe zone, an estimated time until the safety of the potential escape route is compromised, and/or a distance between the potential escape route and the area made unsafe by the emergency situation. Depending upon the emergency situation, the smart home controller 220 may prioritize different factors. In some situations, the fastest (or shortest) possible evacuation may be prioritized, and in others ensuring that the individual 240 stays as far away from the emergency situation as possible may be prioritized.

Additionally, in some scenarios, the smart home controller 220 may be able to determine a particular identity of the individual 240 and prioritize escape routes based upon the particular identity. For example, the smart home controller 220 may maintain a list of individuals that are associated with the property 205. The list may include preferences and/or characteristics of each individual that influence the escape route selection. For example, if the individual 240 is physically handicapped, the smart home controller 220 may avoid selecting escape routes that involve climbing ladders. Similarly, the individual 240 may prefer evacuating to a particular neighboring property based upon their personal relationships. Accordingly, the smart home controller 220 may prioritize escape routes that account for the physical capabilities and/or preferences of the individual 240.

In further situations, the best safe zone may be provided via $3^{rd}$ party data. For example, in particularly widespread emergency situations, the National Guard may establish shelters for all individuals in a particular community. In such situations, the smart home controller 220 may receive data indicating the establishment of such a shelter and/or prioritize escape routes that use the established shelter as the safe zone. In any case, the smart home controller 220 may analyze any relevant priority data to select the best escape route for the individual 240 to evacuate the property 205.

After selecting the best escape route, the smart home controller 220 may transmit (266) the escape route to the electronic device associated with the individual 240 via a communication network. After receiving the escape route, the electronic device may present the escape route to the individual 240. In some embodiments, this may include displaying a visual interface that depicts the escape route, and/or individual steps of the escape route superimposed on a map and/or a floor plan of the property 205. For example, an escape route that leads the individual 240 to a neighboring property may initially be displayed on a floor plan of the property 205; however, once the individual 240 leaves the premises of the property 240, the escape route may be displayed via a mapping program stored on the electronic device (e.g., Google Maps®). Additionally or alternatively, the electronic device may recite directions (such as audibly or visually) that guide the individual 240 along the escape route. It should be appreciated that any suitable method in which the electronic device may guide the individual 240 along the escape route is envisioned.

In addition to transmitting the escape route to the electronic device associated with the individual 240, the smart home controller 220 may also determine (270) a set of actions to be performed by a portion of the plurality of smart devices 210 to ensure the safety of the generated escape route. For example, during a fire, the smart home controller 220 may activate firefighting equipment, such as water sprinklers, and/or de-energize electronic equipment in areas currently on fire. Other exemplary actions that may be performed include shutting off utilities, activating emergency generators, activating a sump pump, deploying a fire ladder, shutting a fire or flood door, activating lighting along an escape route or in halls/rooms associated with the escape room, and/or opening windows. In addition to actions that attempt to contain the emergency situation, a determined action may be to activate a lighted path and/or track lighting to further assist in guiding the individual 240 along the escape route.

Once the set of actions is determined, the smart home controller 220 may generate and transmit (274) instructions that cause the plurality of smart devices 210 to perform (278) the set of actions. The instructions may include an identity of the particular smart device 210 to perform the action and/or an action code associated with the particular functionality each smart device 210. Each smart device 210 may analyze the instructions to determine whether the instructions identify that the particular smart device 210 should perform any actions. If the particular smart device 210 is to perform an action, the particular smart device 210 may analyze the action code to actually perform the instructed action. As an example, a smart water sprinkler may be identified as device abc123 and an action code of "ActivateSprinkler" may cause the smart water sprinkler to activate its sprinkler systems. Accordingly, if the smart water sprinkler determines that the instructions contain an instruction that device abc123 should perform the action "ActivateSprinkler," the smart water sprinkler may activate its sprinkler systems.

It should be appreciated the smart home controller 220 may monitor the progress of the individual 240 as the individual 240 moves along the escape route (for instance by using infrared or motion sensor data, mobile device GPS data, and/or other sensor data). At various points throughout, the smart home controller 220 may determine that a safety tip may be useful to ensure that the individual 240 safely evacuates the property 205. For example, if the smart home controller 220 detects there is smoke in a room along the escape route, the smart home controller 220 may generate and transmit ta safety tip that the individual should crawl to avoid smoke and/or hold a cloth over their mouth to avoid smoke inhalation. Additionally, in response to detecting the emergency situation, the smart home controller 220 may automatically notify emergency responders about the emergency situation. It should be appreciated that signal diagram 200 may include additional, fewer, and/or alternative actions, including those discussed elsewhere herein. For example, in some embodiments, some of the actions described with respect to the smart home controller 220 may be alternatively performed by the processing server 235, and vice versa.

III. EXEMPLARY MODIFIED ESCAPE ROUTE COMMUNICATION

Figure 3:
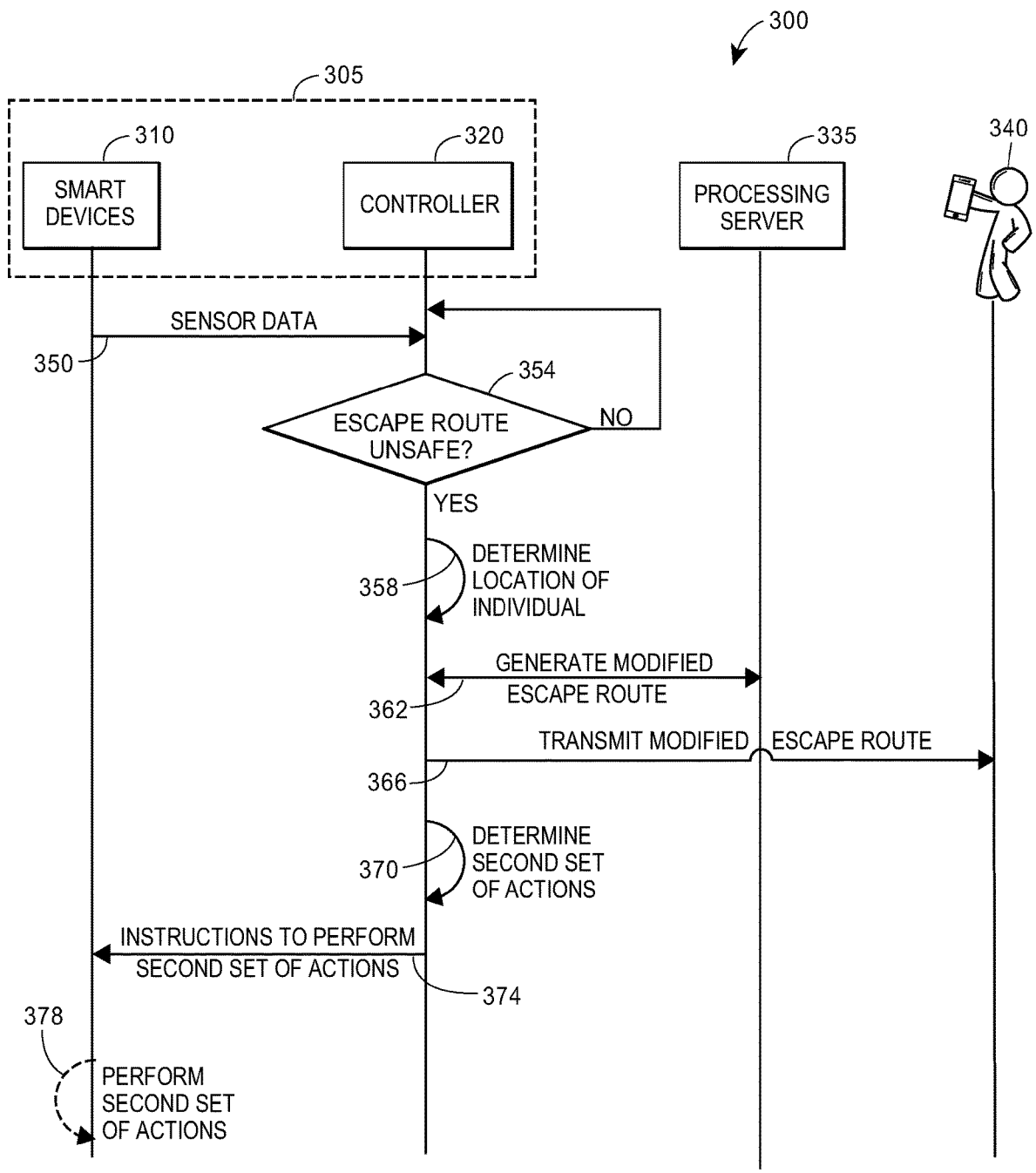
FIG. 3 depicts an exemplary signal diagram associated with generating a modified escape route in response to detecting the original escape route is unsafe, in accordance with some embodiments.

Referring to FIG. 3, illustrated is a signal diagram 300 associated with generating a modified escape route in response to detecting the original escape route is unsafe. In particular, FIG. 3 may include a plurality of smart devices 310 (such as the plurality of smart devices 110 as described with respect to FIG. 1) disposed on a property 305, a smart home controller 320 (such as the smart home controller 120 as described with respect to FIG. 1), a processing server 335 (such as the processing server 135 as described with respect to FIG. 1), and/or an individual 340 (such as the homeowner 140 as described with respect to FIG. 1) associated with an electronic device. In some embodiments, the smart home controller 320 may be coupled to a database that stores floor plan data (such as the floor plan database 122 as described with respect to FIG. 1). It should be appreciated the electronic device may be any electronic device or mobile device (e.g., a smartphone, a desktop computer, a laptop, a tablet, phablet, netbook, notebook, a smart watch, smart glasses, smart contact lenses, wearable electronics device, other type of mobile device, etc.).

During an emergency situation necessitating an evacuation from the property 305, the individual 340 may be traversing an escape route that was generated by the smart home controller 320. While the individual 340 is evacuating the property 305, the smart home controller 320 may continue to receive (350) sensor data from the plurality of devices 310. The smart home controller 320 may analyze the received sensor data to determine (354) whether or not the current escape route is safe for the individual 340 to continue traversing.

For example, the smart home controller 320 may analyze the sensor data to determine that a door along the escape route became blocked due to a roof collapse. As another example, during a flooding situation, the smart home controller 320 may determine that water levels have risen to a point in which electronic devices disposed in the room present a risk of electrocution.

If the smart home controller 320 analyzes the received data and determines that the current escape route for the individual 340 is safe ("NO"), processing may return to the beginning of the signal diagram 300 where the smart home controller 320 may await new data from the smart devices 310. In contrast, if the smart home controller 320 determines that the current escape route for the individual 340 is unsafe ("YES"), the smart home controller 320 may determine (358) an updated location for the individual 340. It should be appreciated that the determination of the updated location of the individual 340 may be performed in a similar manner as determining the original location of the individual as described with respect to step 258 of the signal diagram 200.

Once the updated location of the individual 340 is known, the smart home controller 320 and/or the processing serve 335 may generate (362) a modified escape route to guide the individual 340 from the updated location to the same or an alternate safe zone. The generation of the modified escape route may proceed in a similar manner as the generation of the escape route described with respect to step 262 of the signal diagram 200, except factoring in the updated location of the individual 340 and/or any changes to conditions on the property 305 as reflected in the sensor data received from the plurality of smart devices 310.

After generating the modified escape route, the smart home controller 320 may transmit (366) the modified escape route to the electronic device associated with the individual 340 via a communication network. After receiving the escape route, the electronic device may present the modified escape route to the individual 340 in a manner similar to the presentation described with respect to step 266 of the signal diagram 200.

In addition to transmitting the modified escape route to the mobile device associated with the individual 440, the smart home controller 420 may also determine (370) a second set of actions to be performed by a portion of the plurality of smart devices 310 to ensure the safety of the modified escape route. Once the second set of actions is determined, the smart home controller 320 may generate and transmit (374) instructions that cause the plurality of smart devices 310 to perform (378) the second set of actions. It should be appreciated the generation and/or transmission of the instructions associated with the second set of actions and/or the performance of the second set of actions may be substantially similar to those actions as described with respect to steps 270-278 of the signal 200. It should be appreciated that signal diagram 200 may include additional, fewer, and/or alternative actions, including those discussed elsewhere herein. For example, in some embodiments, some of the actions described with respect to the smart home controller 320 may be alternatively performed by the processing server 335, and vice versa.

IV. EXEMPLARY USER INTERFACES FOR ESCAPE ROUTE INFORMATION

FIGS. 4A and 4B illustrate exemplary interfaces associated with alerting a customer to escape route information to safely evacuate a property. An electronic device (e.g., a smartphone or other mobile device) may be configured to display the interfaces and receive selections and inputs via the interfaces. For example, a dedicated application associated with an insurance provider and/or other entity may be configured to operate on the electronic device to display the interfaces. It should be appreciated that the interfaces are merely examples and that alternative or additional content is envisioned.

FIG. 4A illustrates an interface 400 including details relating to alerting an individual about an emergency situation. In particular, the interface 400 may indicate the nature of the emergency situation ("Tornado Watch"), as well as display directions to proceed to an safe zone to minimize risk of harm due to the emergency situation ("Proceed to your basement"). Further, the interface 400 may depict an escape route guiding the individual to the safe zone. As depicted in the interface 400, this may include displaying a floor plan of the property, the user's current location on the floor plan (the circle at the origination point of the arrow), and/or a route to guide the user to the safe zone (the path indicated by the arrow).

FIG. 4B illustrates an interface 450 including details relating to alerting an individual that the escape route has been changed. In particular, the interface 450 may indicate that the current escape route is no longer safe. Additionally, the interface 450 may provide instructions detailing a modified escape route to safely evacuate the property. The interface 450 may further enable the user to dismiss the alert via an "OK" selection. In response, the electronic device may present a new interface for monitoring the user's progress as the user traverses the modified escape route. The exemplary interfaces may include additional, less, or alternate functionality, including functionality described elsewhere herein.

V. EXEMPLARY METHODS OF ESCAPE ROUTE DETERMINATION

Figure 5:
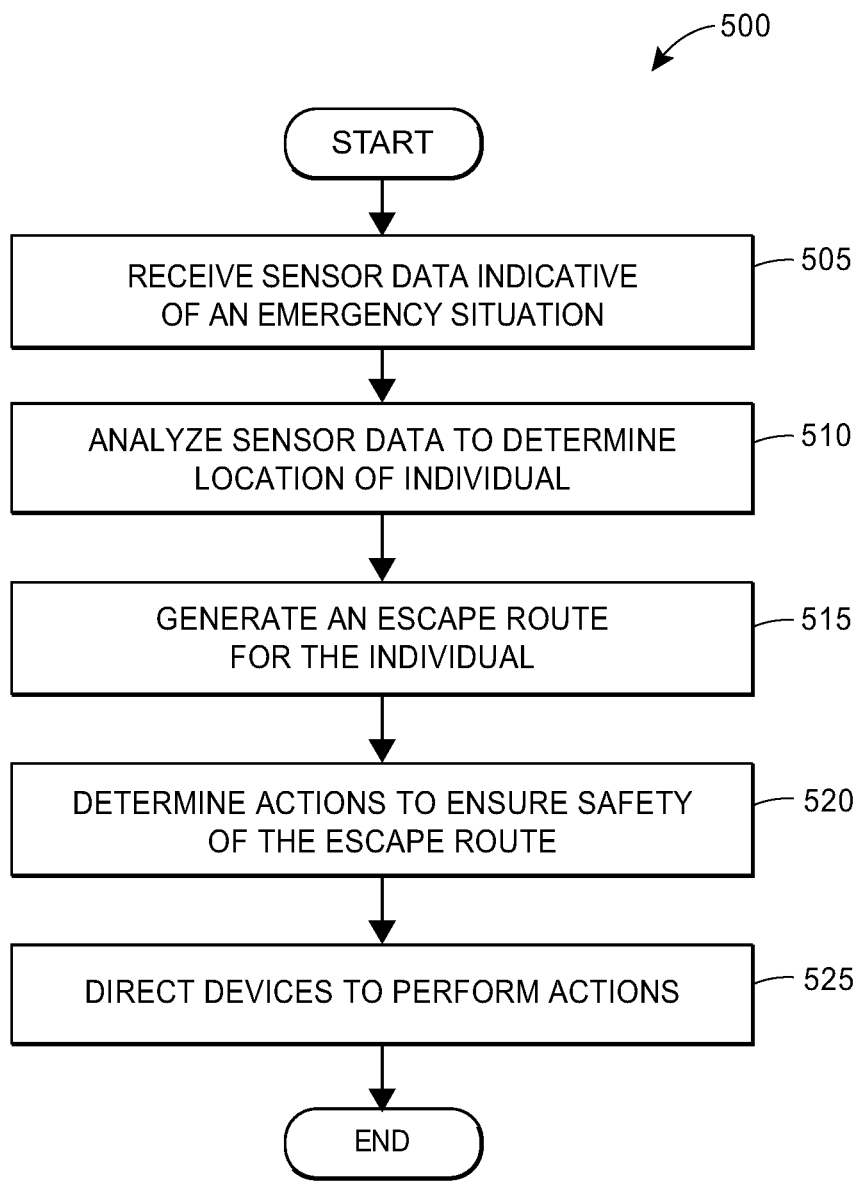
FIG. 5 depicts an exemplary flow diagram associated with generating an escape route in response to detecting an emergency situation, in accordance with some embodiments.

Referring to FIG. 5, depicted is a block diagram of an exemplary method 500 of determining an escape route for individuals on a property. The method 500 may be facilitated by a hardware controller within the property, such as the smart home controller 120 as described with respect to FIG. 1, that may be in direct or indirect communication with an insurance provider (such as the insurance provider 130 or the processor server 135 thereof).

The method 500 may begin when the controller receives (block 505) a sensor data indicative of an emergency situation from a plurality of devices disposed on the property. For example, the sensor data may include data indicating a fire alarm in a bedroom has been triggered and/or thermal sensor data indicating the presence of a fire in the bedroom. As another example, the sensor data may indicate that the structural integrity of a portion of the property has been compromised. It should be appreciated that the emergency situation may be any emergency event, including those described elsewhere herein.

Once the controller determines that there is an emergency situation on the property, the controller may analyze (block 510) another portion of the sensor data to determine whether any individuals are present on the property and, if so, their respective locations on the property. The presence of the individuals on the property may be determined via motion sensors, facial recognition, detecting an electronic device associated with an individual, or any other method of determining the presence of individuals within a property.

When the controller detects that there are individuals on the property, the controller may generate (block 515) an escape route for the individuals to safely exit the property. In order to generate the escape route, the controller may compare the location of the individuals to the location of the emergency situation. An escape route may lead the individuals from their current location on the property to a safe location (either on the same property or on a nearby property). The escape route may also factor in the location of the emergency situation to ensure the safety of the individuals on the property. For example, if an individual is in a bedroom and there is a fire in the outside hallway, the controller may generate an escape route that utilizes a fire escape and/or ladder instead of leading the individual through the burning hallway. Accordingly, in some situations, the escape route may not be the most direct route for an individual to evacuate the property. The controller may determine an escape route for each individual present on the property.

Once the escape route(s) are determined, the controller may determine (block 520) a set of actions to perform to ensure the safety of the escape route. Returning to the hallway fire example, the set of actions may include deploying a fire ladder and/or unlatching or opening a smart window, or energizing lighting. Other actions to ensure escape route safety may include closing fire doors to contain a fire, de-energizing electronics, closing gas valves, activating sprinkler systems, illuminating emergency track lighting, and/or any other action that can aid in the safe evacuation of individuals on the property.

The controller may direct (block 525) devices disposed on the property to perform the set of actions. In some implementations, the controller may generate an instruction that, when received by a particular device, causes the device to perform a particular action of the set of actions. This instruction may be communicated over a local network. In some embodiments, the instruction may include an identification of the device to perform the action, an indication of device property to change, an indication of a value of the new device property, a time when the device property should change, and/or any other pertinent information to controlling a smart device.

In some implementations, in addition to directing the devices to perform the action, the controller may communicate the escape route to an electronic device associated with the corresponding individual present on the property. The communication may provide the nature and location of the emergency situation, a layout of the property, step-by-step instructions directing the individual along the escape route, and/or any other information pertinent to the individual safely evacuating the property.

In some further implementations, as the individual proceeds along an escape route, the controller may receive a second set of sensor data indicating that the emergency situation has changed and/or worsened and that the original escape route is no longer safe. For example, the ceiling in a room that the escape route leads through may have collapsed, blocking the escape route. In response, the controller may determine a modified escape route to safely evacuate the property, direct devices to perform actions to ensure the safety of the modified escape route, and/or communicate the modified escape route to an individual present on the property.

V. EXEMPLARY ESCAPE ROUTE DETERMINATION METHOD

In one aspect, a computer-implemented method of escape route management for a property may be provided. The property may be populated with a hardware controller in communication with a plurality of devices and each of the plurality of devices may be configured to monitor various conditions associated with the property. The method may include (1) receiving, by the hardware controller via a first communication network, a first set of sensor data from at least one of the plurality of devices, the first set sensor data indicative of an emergency situation necessitating evacuation; (2) analyzing, by one or more processors, the first set of sensor data to determine that an individual is located on the property, the first set of sensor data indicating a location of the individual; (3) based upon the first set of sensor data and the location of the individual, determining, by the one or more processors, an escape route for the individual to evacuate an area made unsafe by the emergency situation; (4) determining, by the one or more processors, a first set of actions to be performed by a first portion of the plurality of devices to ensure safety of the escape route; and/or (5) directing and/or controlling, by the one or more processors, the first portion of the plurality of devices to perform the first set of actions to facilitate escape from the emergency situation using the escape route. The method may include additional, less, or alternate actions, including those discussed elsewhere herein, and/or may be implemented via one or more local or remote processors (such as smart home controllers, mobile devices, insurance provider remote servers, etc.) and/or computer-executable instructions stored on non-transitory computer-readable medium or media.

For instance, directing and/or controlling the first portion of the plurality of devices to perform the first set of actions may include directing or controlling, by the one or more processors, the first portion of the plurality of devices to perform at least one of shutting off utilities, de-energizing electronic equipment, activating emergency generators, activating a sump pump, activating a lighted path indicating the direction of the escape route, deploying a fire ladder, shutting a fire or flood door, and/or opening or closing windows.

The method may include transmitting, by the hardware controller via a second communication network, the escape route to a mobile device associated with the individual. Transmitting the escape route to the mobile device associated with the individual may include determining, by the one or more processors, a safety tip based upon the determined escape route; and/or transmitting, by the hardware controller via the second communication network, the safety tip to the mobile device associated with the individual. Transmitting the escape route to the mobile device associated with the individual may also cause the mobile device to perform at least one of displaying, on a visual interface, the escape route superimposed on a virtual map or a floor plan of the property, and/or reciting, via an audio output, directions guiding the individual along the escape route.

Determining the escape route for the individual may include (1) determining, by the one or more processors, a plurality of safe zones that are associated with a low risk of harm due to the emergency situation; (2) generating, by the one or more processors, a plurality of routes between the location of the individual and any one of the plurality of safe zones, wherein the plurality of routes avoid guiding the individual through the area made unsafe by the emergency situation; and/or (3) selecting, by the one or more processors, a best route from the plurality of routes to be the escape route. Selecting the best route may include analyzing, by the one or more processors, a plurality of factors associated with each of the plurality of routes. The plurality of factors may include at least one of an estimated time to reach a safe zone, an estimated time until a safety of the route is compromised, a distance between the route and the area made unsafe by the emergency situation, an accessibility of the route, and/or one or more preferences associated with the individual.

The method may include receiving, by the hardware controller via a first communication network, a second set of sensor data from at least one of the plurality of devices, the second set of sensor data indicating that the escape route is no longer safe; and/or based upon the second set of sensor data and an updated location of the individual, determining, by the one or more processors, a modified escape route.

The method may include (1) transmitting, by the hardware controller via a second communication network, the modified escape route to a mobile device associated with the individual on the property; (2) determining, by the one or more processors, a second set of actions to be performed by a second portion of the plurality of devices to ensure safety of the modified escape route; and/or (3) directing and/or controlling, by the one or more processors, the second portion of the plurality of devices to perform the second set of actions. The method may also include adjusting an insurance policy, premium, or discount (such as a homeowners, renters, auto, home, health, or life insurance policy, premium, or discount) based upon the escape route and/or other functionality discussed herein, and/or an insured having a home and/or mobile device with such functionality.

VI. EXEMPLARY ESCAPE ROUTE DETERMINATION SYSTEM

In one aspect, a system for escape route management for a property may be provided. The property populated with a hardware controller in communication with a plurality of devices and each of the plurality of devices may be configured to monitor various conditions associated with the property. The system may include (i) a communication module adapted to communicate data; (ii) a memory adapted to store non-transitory computer executable instructions; and (iii) one or more processors adapted to interface with the communication module. The one or more processors may be configured to execute the non-transitory computer executable instructions to cause the system to (1) receive, via the communication module, a first set of sensor data from at least one of the plurality of devices, the first set sensor data indicative of an emergency situation necessitating evacuation; (2) analyze, by the one or more processors, the first set of sensor data to determine that an individual is located on the property, the first set of sensor data indicating a location of the individual; (3) based upon the first set of sensor data and the location of the individual, determine, by the one or more processors, an escape route for the individual to evacuate an area made unsafe by the emergency situation; (4) determine, by the one or more processors, a first set of actions to be performed by a first portion of the plurality of devices to ensure safety of the escape route; and/or (5) direct and/or control, by the one or more processors, the first portion of the plurality of devices to perform the first set of actions to facilitate using an escape route. The system may include additional, less, or alternate actions, including those discussed elsewhere herein.

For instance, the one or more processors may be configured to execute the non-transitory computer executable instructions to cause the system to transmit, via the communication module, the escape route to a mobile device associated with the individual.

To transmit the escape route to the mobile device associated with the individual, the one or more processors are may be configured to execute the non-transitory computer executable instructions to cause the system to determine, by the one or more processors, a safety tip based upon the determined escape route; and/or transmit, via the communication module, the safety tip to the mobile device associated with the individual. The communication module transmitting the escape route to the mobile device associated with the individual may cause the mobile device to perform at least one of displaying, on a visual interface, the escape route superimposed on a virtual map or a floor plan of the property, and/or reciting, via an audio output, directions guiding the individual along the escape route.

To determine the escape route for the individual, the one or more processors may be configured to execute the non-transitory computer executable instructions to cause the system to (1) determine, by the one or more processors, a plurality of safe zones that are associated with a low risk of harm due to the emergency situation; (2) generate, by the one or more processors, a plurality of routes between the location of the individual and any one of the plurality of safe zones, wherein the plurality of routes avoid guiding the individual through the area made unsafe by the emergency situation; and/or (3) select, by the one or more processors, a best route from the plurality of routes to be the escape route.

To select the best route, the one or more processors may be configured to execute the non-transitory computer executable instructions to cause the system to analyze, by the one or more processors, a plurality of factors associated with each of the plurality of routes, wherein the plurality of factors may include at least one of an estimated time to reach a safe zone, an estimated time until a safety of the route is compromised, a distance between the route and the area made unsafe by the emergency situation, an accessibility of the route, and/or one or more preferences associated with the individual.

The one or more processors may be configured to execute the non-transitory computer executable instructions to cause the system to receive, via the communication module, a second set of sensor data from at least one of the plurality of devices, the second set of sensor data indicating that the escape route is no longer safe; and/or based upon the second set of sensor data and an updated location of the individual, determine, by the one or more processors, a modified escape route.

The one or more processors may be configured to execute the non-transitory computer executable instructions to cause the system to (1) transmit, by the hardware controller via a second communication network, the modified escape route to a mobile device associated with the individual on the property; (2) determine, by the one or more processors, a second set of actions to be performed by a second portion of the plurality of devices to ensure safety of the modified escape route; and/or (3) direct control, by the one or more processors, the second portion of the plurality of devices to perform the second set of actions.

VII. EXEMPLARY SMART HOME CONTROLLER

Figure 6:
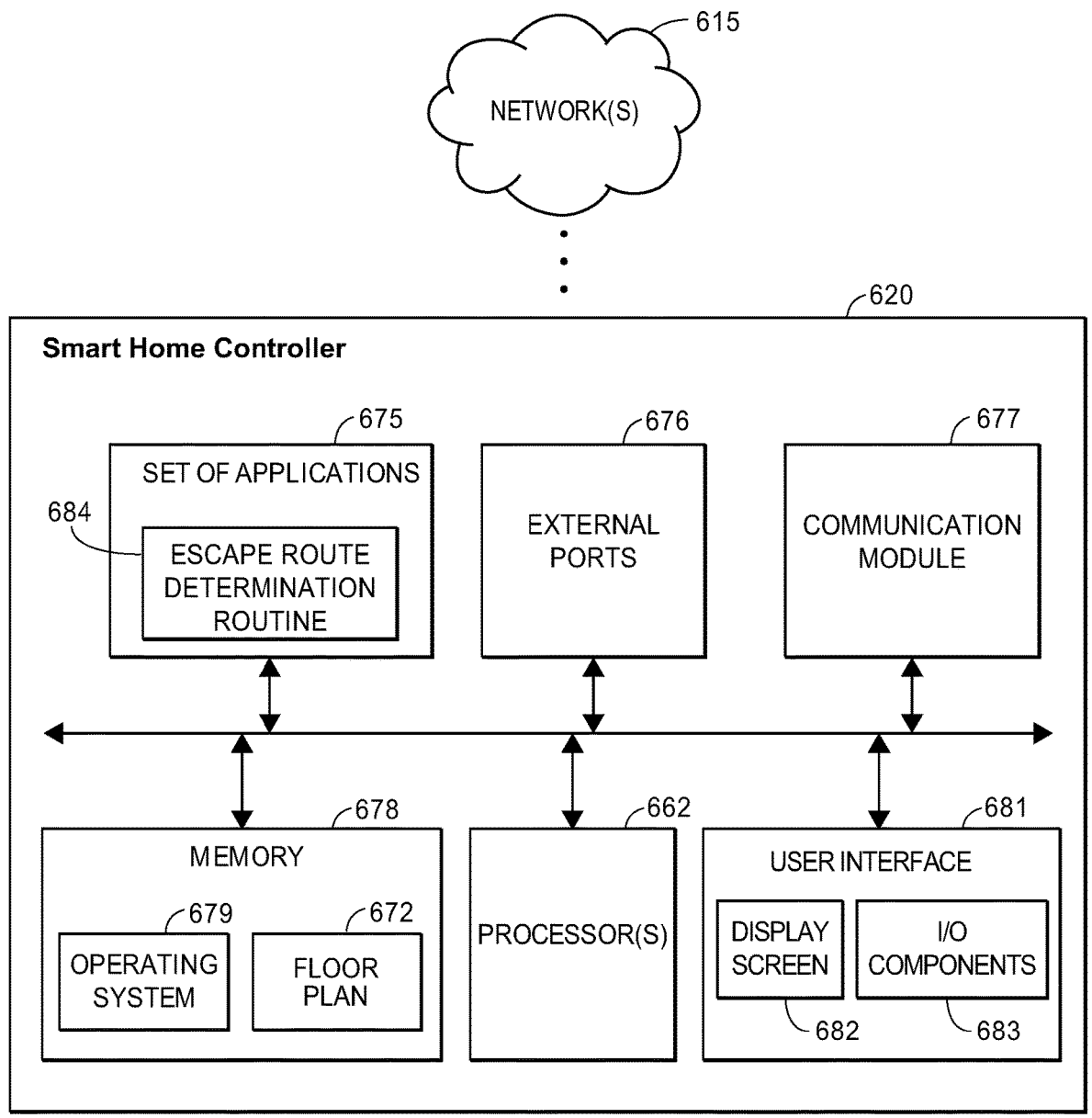
FIG. 6 depicts a block diagram of a smart home controller, in accordance with some embodiments.

FIG. 6 illustrates a diagram of an exemplary smart home controller 620 (such as the smart home controller 120 as discussed with respect to FIG. 1) in which the functionalities as discussed herein may be implemented. It should be appreciated that the smart home controller 620 may be associated with a property, as discussed herein.

The smart home controller 620 may include a processor 622, as well as a memory 678. The memory 678 may store an operating system 679 capable of facilitating the functionalities as described herein. The smart home controller 620 may also store a set of applications 675 (i.e., machine readable instructions). For example, one application of the set of applications 675 may be an escape route determination routine 684 configured to generate escape routes for individuals located the property during an emergency situation. It should be appreciated that other applications may be included in the set of application 675.

The processor 622 may interface with the memory 678 to execute the operating system 679 and the set of applications 675. According to some embodiments, the memory 678 may also include floor plan data 672 that includes information related to the layout of the property and/or the locations of devices and/or individuals on the property. The escape route determination routine 684 may access the floor plan 672 to determine an escape route. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The smart home controller 620 may further include a communication module 677 configured to communicate data via one or more networks 615. Network(s) 615 may include both a local network for communicating between devices mounted on, or proximate to, the property and a remote network for communicating between the property and external parties. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. In some embodiments, the communication module 677 may include separate transceivers configured to interact with the local and remote networks separately. The smart home controller 620 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to the present embodiments, the user may access the smart home controller 620 via the user interface 681 to monitor the status of the plurality of smart devices associated with a property, control the plurality of smart devices associated with the property, indicate evacuation preferences and/or limitations, and/or perform other functions. In some embodiments, the smart home controller 620 may perform the functionalities as discussed herein as part of a "cloud" network, or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VIII. ADDITIONAL EMBODIMENTS

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller, and/or insurance provider remote processor(s), may issue commands to the devices or otherwise control operation of the devices. Upon receipt, the appropriate device may execute the command(s) to cause the smart device to perform an action or enter a preferred operation state. The central controller, and/or insurance provider remote processor(s), may also generate notifications of various operation states or completed actions, and communicate the notifications to individuals associated with the property.

Generally, the systems and methods offer numerous benefits to operation of devices within the property, as well as to individuals associated with the property. In particular, the systems and methods may automatically detect potential or actual issues with the property that the individuals may not realize exist, and may automatically facilitate preventative or corrective actions to address the issues. As a result, security associated with the property may improve. Further, the systems and methods improve loss prevention and mitigate actual loss. The systems and methods further apply to independent and/or assisted living situations, whereby patients may receive improved care and individuals associated with the patients may realize more effective communication. Additionally, the systems and methods may improve energy consumption.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The smart home controller or remote processor may automatically direct or control (i) opening (and/or unlocking) smart windows and/or smart doors, and/or (ii) lighting up an evacuation path (e.g., remotely operating smart lighting or lamps) when a fire event is detected within the insured home by the smart home controller or remote processor to facilitate occupants evacuating the insured home during the fire event. Additionally or alternatively, the smart home controller or remote processor may automatically direct or control (i) lighting up an evacuation path (e.g., remotely operating smart lighting or lamps) and/or (2) deploying evacuation equipment (e.g., rope or ladder deployment) when a fire event is detected within the insured home by the smart home controller or remote processor to facilitate occupants evacuating the insured home during the fire event.

The insured home may have smart doors that include smart hinges. The smart hinges may be configured to (1) automatically open when a fire event is detected within the insured home by the smart home controller or remote processor, and (2) it is determined by the smart home controller or remote processor that the insured home is occupied to facilitate occupant evacuation. Additionally or alternatively, the smart hinges may be configured to (3) automatically close when a fire event is detected within the insured home by the smart home controller or remote processor, and (4) it is determined by the smart home controller or remote processor that the insured home is unoccupied to facilitate fire suppression.

In some embodiments, data from one of the smart devices may cause certain actions for another of the devices. For instance, if a smoke alarm triggers, then hinges (e.g., smart hinges) on a set of interior doors may cause the set of interior doors to close.

The insured home may have smart doors that include smart door knobs. The smart door knobs may be configured to change color or glow when a fire event is detected to facilitate insured home occupants finding doors within smoke-filled rooms or homes. Additionally or alternatively, the smart door knobs may be configured to change color or glow when a fire event is detected (such as by a heat sensor integrated with the smart door knob) to indicate that there is a fire, or potential fire, on the other side of the smart door.

IX. ADDITIONAL CONSIDERATIONS

As used herein, the term "smart" may refer to devices, sensors or appliances located inside or proximate to a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the level water contained therein and receive instructions to restrict the flow of water leaving the tank. In contrast, "dumb" devices, sensors, or appliances located inside or proximate to a property require manual control. Referring again to the thermostat example, to adjust the temperature on a "dumb" thermostat, a person would have to manually interact with the thermostat. As such, a person may be unable to use a communication network to remotely adjust a "dumb" device, sensor, or appliance.

For simplicity's sake, a "smart device" shall be used herein to refer to any of a smart device, sensor, appliance, and/or other smart equipment that may be disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. An individual associated with the property shall be referred to as the "homeowner," but it is also envisioned that the individual is a family member of the homeowner, a person renting/subletting the property, a person living or working on the property, a neighbor of the property, an insured, or any other individual that may have an interest in preventing or mitigating damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

While the terms "escape the property" and "evacuate the property" are used herein may generally refer to leaving the property, there are some scenarios in which an individual may "escape the property" and/or "evacuate the property" to a location still on the premises of the property. For example, a property may contain a "safe room" for taking shelter in the event of a home invasion. As another example, in a tornado situation, the appropriate response may be to "evacuate" to the basement. Accordingly, as used herein, any references to "escaping the property" or "evacuating from the property" (or other similar references) are not limited to scenarios in which the escape route guides the individual off the premises of the property, but additionally incorporates scenarios in which the appropriate safe zone to escape the emergency situation is actually still on the premises of the property.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission. The data collected may be related to insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider based upon employing or otherwise having the functionality (such as escape route determination functionality) discussed herein.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of escape route management for a property, the property populated with a hardware controller in communication with a plurality of smart devices, each of the plurality of smart devices configured to monitor various conditions associated with the property, the method comprising:
   receiving, by the hardware controller via a first communication network, sensor data indicative of an emergency situation necessitating evacuation from at least one of the plurality of smart devices;
   analyzing, by one or more processors, the sensor data to determine a location of an individual located on the property;
   based upon the sensor data and the location of the individual, determining, by the one or more processors, an escape route for the individual to evacuate an area made unsafe by the emergency situation;
   determining, by the one or more processors, a first set of actions to be performed by a first portion of the plurality of smart devices to ensure safety of the escape route, the first set of actions including an action that contains the emergency situation; and
   directing or controlling, by the hardware controller, the first portion of the plurality of smart devices to perform the first set of actions to facilitate the individual escaping the emergency situation using the escape route.

2. The computer-implemented method of claim 1, wherein directing or controlling the first portion of the plurality of smart devices to perform the first set of actions comprises:
   directing or controlling, by the hardware controller, the first portion of the plurality of smart devices to contain the emergency situation by performing at least one of: shutting off utilities, de-energizing electronic equipment, activating emergency generators, activating a sump pump, deploying a fire ladder, shutting a fire or flood door, or opening windows.

3. The computer-implemented method of claim 1, further comprising:
   transmitting, by the hardware controller via a second communication network, the escape route to a mobile device associated with the individual.

4. The computer-implemented method of claim 3, wherein transmitting the escape route to the mobile device associated with the individual comprises:
   determining, by the one or more processors, a safety tip based upon the escape route; and transmitting, by the hardware controller via the second communication network, the safety tip to the mobile device associated with the individual.

5. The computer-implemented method of claim 3, wherein transmitting the escape route to the mobile device associated with the individual causes the mobile device to perform at least one of:
   displaying, on a visual interface, the escape route superimposed on a map or a floor plan of the property, or
   reciting, via an audio output, directions guiding the individual along the escape route.

6. The computer-implemented method of claim 1, wherein determining the escape route for the individual further comprises:
   determining, by the one or more processors, a plurality of safe zones that are associated with a low risk of harm due to the emergency situation; and
   generating, by the one or more processors, a plurality of routes between the location of the individual and any one of the plurality of safe zones, wherein the plurality of routes avoid guiding the individual through the area made unsafe by the emergency situation.

7. The computer-implemented method of claim 6, further comprising:
   selecting, by the one or more processors, the escape route from the plurality of routes by analyzing a plurality of additional factors associated with each of the plurality of routes, wherein the plurality of additional factors includes at least one of:
   an estimated time to reach one of the plurality of safe zones, an estimated time until a safety of the route is compromised, a preference of the individual, or a distance between the route and the area made unsafe by the emergency situation, an accessibility of the route.

8. The computer-implemented method of claim 1, further comprising:
   receiving, by the hardware controller via the first communication network, a second set of sensor data from at least one of the plurality of smart devices, the second set of sensor data indicating that the particular escape route is no longer safe; and
   based upon the second set of sensor data and an updated location of the individual, determining, by the one or more processors, a modified escape route.

9. The computer-implemented method of claim 8, further comprising:
   transmitting, by the hardware controller via a second communication network, the modified escape route to a mobile device associated with the individual on the property.

10. The computer-implemented method of claim 8, further comprising:
   determining, by the one or more processors, a second set of actions to be performed by a second portion of the plurality of smart devices to ensure safety of the modified escape route; and
   directing or controlling, by the one or more processors, the second portion of the plurality of smart devices to perform the second set of actions.

11. A system for escape route management for a property, the property populated with a hardware controller in communication with a plurality of smart devices, each of the plurality of smart devices configured to monitor various conditions associated with the property, the system comprising:
   a communication module adapted to communicate data;
   a memory adapted to store non-transitory computer executable instructions; and
   one or more processors adapted to interface with the communication module, wherein the one or more processors are configured to execute the non-transitory computer executable instructions to cause the system to:
   receive, via the communication module, sensor data indicative of an emergency situation necessitating evacuation from at least one of the plurality of smart devices;
   analyze, by the one or more processors, the sensor data to determine a location of an individual located on the property;
   based upon the sensor data and the location of the individual, determine, by the one or more processors, an escape route for the individual to evacuate an area made unsafe by the emergency situation;
   determine, by the one or more processors, a first set of actions to be performed by a first portion of the plurality of smart devices to ensure safety of the escape route, the first set of actions including an action that contains the emergency situation; and
   direct or control, by the one or more processors and via the communication module, the first portion of the plurality of smart devices to perform the first set of actions to facilitate ensuring safety of the escape route.

12. The system of claim 11, wherein the one or more processors are further configured to execute the non-transitory computer executable instructions to cause the system to:
   transmit, via the communication module, the escape route to a mobile device associated with the individual.

13. The system of claim 12, wherein to transmit the escape route to the mobile device associated with the individual, the one or more processors are further configured to execute the non-transitory computer executable instructions to cause the system to:
   determine, by the one or more processors, a safety tip based upon the escape route; and transmit, via the communication module, the safety tip to the mobile device associated with the individual.

14. The system of claim 13, wherein the communication module transmitting the escape route to the mobile device associated with the individual causes the mobile device to perform at least one of:
   displaying, on a visual interface, the escape route superimposed on a map or a floor plan of the property, or
   reciting, via an audio output, directions guiding the individual along the particular escape route.

15. The system of claim 11, wherein to determine the plurality of escape routes for the individual, the one or more processors are further configured to execute the non-transitory computer executable instructions to cause the system to:
   determine, by the one or more processors, a plurality of safe zones that are associated with a low risk of harm due to the emergency situation; and
   generate, by the one or more processors, a plurality of routes between the location of the individual and any one of the plurality of safe zones, wherein the plurality of routes avoid guiding the individual through the area made unsafe by the emergency situation.

16. The system of claim 15, wherein the one or more processors are further configured to execute the non-transitory computer executable instructions to cause the system to:
   select, by the one or more processors, the escape route from the plurality of routes by analyzing a plurality of additional factors associated with each of the plurality of routes, wherein the plurality of factors includes at least one of:
   an estimated time to reach one of the plurality of safe zones, an estimated time until a safety of the route is compromised, a preference of the individual, or a distance between the route and the area made unsafe by the emergency situation, an accessibility of the route.

17. The system of claim 11, wherein the one or more processors are further configured to execute the non-transitory computer executable instructions to cause the system to:
   receive, via the communication module, a second set of sensor data from at least one of the plurality of smart devices, the second set of sensor data indicating that the particular escape route is no longer safe; and
   based upon the second set of sensor data and an updated location of the individual, determine, by the one or more processors, a modified escape route.

18. The system of claim 17, wherein the one or more processors are further configured to execute the non-transitory computer executable instructions to cause the system to:
   transmit, by the hardware controller via a second communication network, the modified escape route to a mobile device associated with the individual on the property.

19. The computer-implemented method of claim 17, wherein the one or more processors are further configured to execute the non-transitory computer executable instructions to cause the system to:
   determine, by the one or more processors, a second set of actions to be performed by a second portion of the plurality of smart devices to ensure safety of the modified escape route; and
   director control, by the one or more processors, the second portion of the plurality of smart devices to perform the second set of actions.

20. A non-transitory computer-readable storage medium storing processor-executable instructions, that when executed cause one or more processors to:
   receive by the one or more processors via a local communication network, sensor data indicative of an emergency situation necessitating evacuation from at least one of a plurality of smart devices;
   analyze, by the one or more processors, the sensor data to determine a location of an individual located on the property;
   based upon the first set of sensor data and the location of the individual, determine, by the one or more processors, an escape route for the individual to evacuate an area made unsafe by the emergency situation;
   determine, by the one or more processors, a first set of actions to be performed by a first portion of the plurality of smart devices to ensure safety of the escape route, the first set of actions including an action that contains the emergency situation; and direct or control, by the one or more processors and via the local communication network, the first portion of the plurality of smart devices to perform the first set of actions to facilitate an individual using the escape route to escape from or evade the emergency situation.

\* \* \* \* \*